United States Patent [19]

Basek et al.

[11] Patent Number: 5,058,493
[45] Date of Patent: Oct. 22, 1991

[54] COOKING DEVICE

[76] Inventors: Charles Basek, 1218 Old Colony Road, Oakville, Ontario; Phil Mathews, 1 Manison Street, Bramalea, Ontario; Terry L. Newcombe, 7 Duern Street, Toronto, Ontario, all of Canada

[21] Appl. No.: 422,529

[22] Filed: Oct. 17, 1989

[51] Int. Cl.⁵ .................. A47J 37/04; A47J 43/18
[52] U.S. Cl. .................. 99/339; 99/421 H; 99/427; 99/441
[58] Field of Search .................. 99/340, 421 R, 427, 99/443 R, 448, 339, 441, 443 C, 421 H, 421 HH, 421 HV; 126/25 R, 9 R, 9 B, 41 R, 41 B, 181; 29/148.4 D, 115, 895; 198/780, 788, 789

[56] References Cited

U.S. PATENT DOCUMENTS

| 902,724 | 11/1908 | Giovanna | 99/421 HV |
|---|---|---|---|
| 1,308,686 | 7/1919 | Spirek | 198/780 X |
| 2,185,979 | 1/1940 | Dumas | 99/441 X |
| 2,259,073 | 10/1941 | McGlaughlin | 99/427 |
| 2,604,842 | 7/1952 | Dolce | 99/423 |
| 2,939,384 | 6/1960 | Vinson | 99/421 HH |
| 3,320,873 | 5/1967 | Nissan et al. | 99/423 |
| 3,331,308 | 7/1967 | Hoffert | 99/340 |
| 3,582,356 | 6/1971 | Thomas | 99/421 HH X |
| 3,733,999 | 5/1973 | Bernstein | 99/421 H X |
| 3,854,392 | 12/1974 | Eason | 99/421 H |
| 4,370,920 | 2/1983 | Henriques et al. | 99/339 |
| 4,760,776 | 8/1988 | Beidler | 99/421 H |

FOREIGN PATENT DOCUMENTS 933813  8/1963  United Kingdom .......... 99/421 HV

Primary Examiner—Harvey C. Hornsby
Assistant Examiner—Scott J. Haugland

[57] ABSTRACT

A cooking device for rotating foods on a barbeque has a frame, a plurality of front bearings in a front wall and an equal number of rear bearings in a rear wall arranged in pairs on common axes, a plurality of cylindrical rollers received in respective pairs of bearings, and having drive portions extending outwardly from the front or rear wall means, and a chain drive rotating the rollers, and in which the tubular rollers are disengagable from the bearings and the chain drive for cleaning.

4 Claims, 4 Drawing Sheets

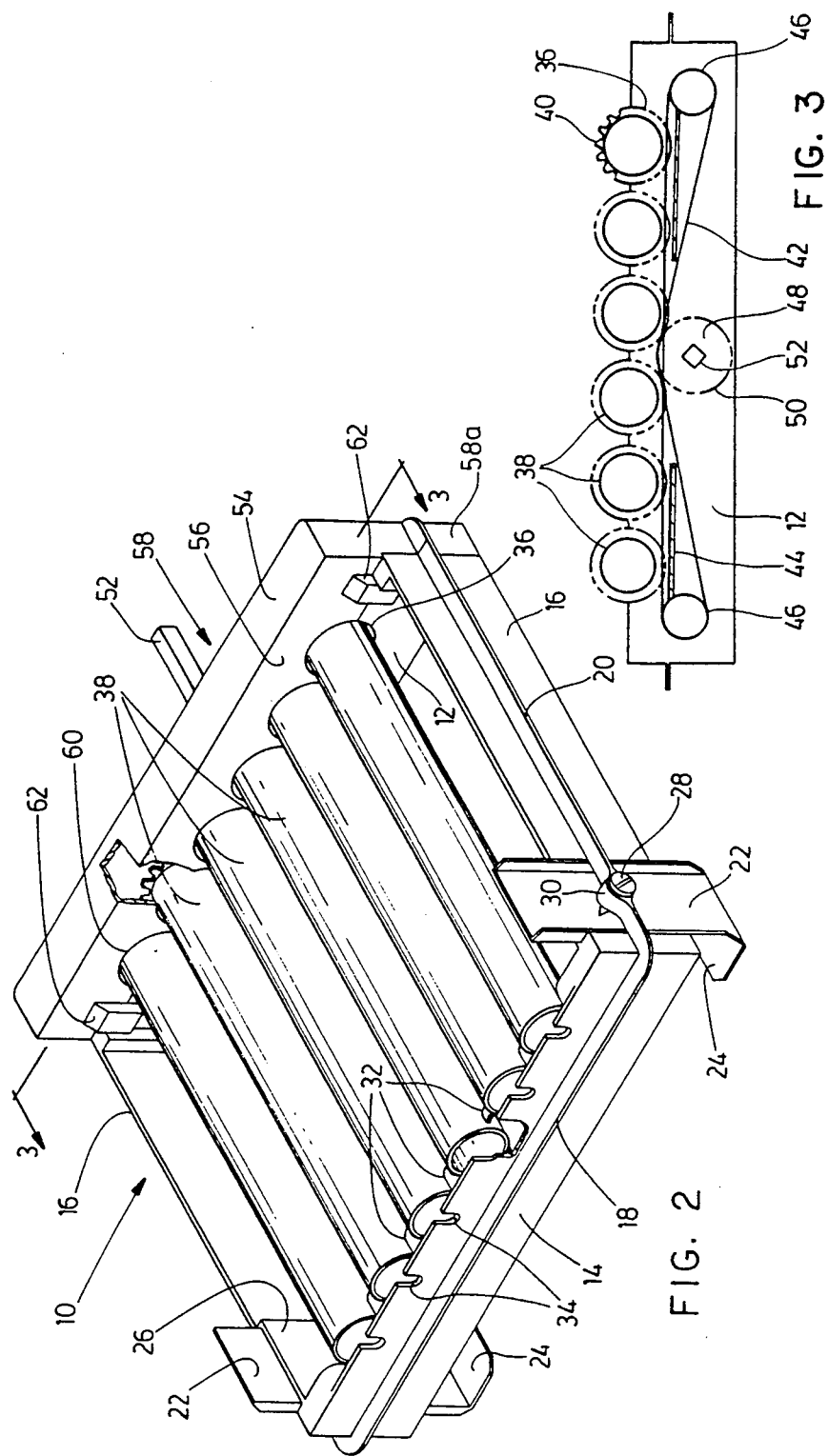

COOKING DEVICE

FIELD OF THE INVENTION

The invention relates to a cooking device for rotating various foods whilst being cooked.

BACKGROUND OF THE INVENTION

In the cooking of certain foods it is advantageous if the items of food are rotated during cooking. This is particularly true of items such as sausages, hot dogs, poultry, roasts, meat sections on skewers, commonly known as shishkebabs, and corn and the like.

Various such rotary cooking devices have been manufactured, or proposed, in the past, principally for use in restaurants and commercial kitchens. Generally speaking, they are relatively large, heavy duty pieces of equipment designed for permanent installation.

However, it is well known that food items such as sausages, hot dogs, and shishkebabs are popular for cooking in the home, or in the backyard over a barbecue. There have been some proposals for rotary cooking devices for domestic use in this way. However, they have suffered from various drawbacks. In some cases, they were excessively expensive. In others, they were not readily adaptable to cooking different type of food items. For example, rotary cooking devices for cooking sausages and hot dogs commonly employ rollers arranged side by side, and rotating so as to rotate the sausages. Shishkebabs, however, will not readily cook on roller-type devices, but will cook on skewers if the skewers themselves are rotated. Other forms of food can be cooked on a barbeque such as, for example, corn, poultry, and the like, and it is advantageous if the food item is rotated.

Cleaning such a device after use should also be as simple as possible preferably with most components being dismountable, for placing in the dishwasher.

BRIEF SUMMARY OF THE INVENTION

With a view to providing the various combinations of functions noted above, the invention comprises a cooking device, which device in turn comprises frame means of generally rectangular shape, defining front and rear wall means and side wall means, a plurality of generally semi-circular front bearing means formed in said front wall means, and an equal number of generally semi-circular rear bearing means formed on said rear wall means, respective said front and rear bearing means being arranged in pairs on common axes, in registration with one another, a plurality of cylindrical roller members, said roller members being dimensioned to be received in respective pairs of said generally semi-circular front and rear bearing means, and to be suported thereby for rotation, drive portions of said roller members extending outwardly of one of said front and rear wall means and defining sprocket means, chain drive means interengageable with respective sprocket means on respective said roller members, chain movement means engageable with said chain drive means for moving the same whereby to rotate all of said roller members simultaneously, drive transmission means connected to said chain movement means, and being releaseably and supportively interengageable with a suitable motor means, said cylindrical roller members being disengagable from said front and rear bearing means and said chain drive means, by lifting said roller members therefrom, and whereby they may be re-engaged by placing them downwardly thereupon More particularly, it is an objective of the invention to provide a cooking device having the foregoing advantages, wherein said front bearing means comprise generally U-shaped recesses in said front wall means, and wherein said rear bearing means comprise generally semi-circular flange means on said rear wall means, and wherein said cylindrical roller members are dimensioned to extend outwardly of said front bearing means in said front wall means, said sprocket means being mounted thereon, and said chain drive means being supported on said front wall means, beneath said sprocket means.

More particularly, it is an objective of the invention to provide a cooking device having the foregoing advantages and further including rear bearing recess means formed in said rear wall means, being located coaxial with said common axes of said front and rear bearing means.

More particularly, it is an objective of the invention to provide a cooking device having the foregoing advantages, and further including ledge means on said front wall means, located downwardly of said front bearing means, and chain guide means located at either end of said ledge means, whereby said chain drive means is moveable along said ledge means from one said chain guide means to the other.

More particularly, it is an objective of the invention to provide a cooking device having the foregoing advantages and wherein said chain movement means comprises drive sprocket means, a drive shaft on which said drive sprocket means is mounted, shaft bearing means on said front wall means, located at a point intermediate the ends of said front wall means, and engageable with said chain drive means, and said drive shaft including a shaft extension portion adapted to be releaseably and supportively interengaged with suitable motor means.

The various features of novelty which characterize the invention are pointed out with more particularity in the claims annexed to and forming a part of this disclosure. For a better understanding of the invention, its operating advantages and specific objects attained by its use, reference should be had to the accompanying drawings and descriptive matter in which there are illustrated and described preferred embodiments of the invention.

IN THE DRAWINGS

FIG. 2 is a perspective illustration of the cooking device partially cut away;

FIG. 3 is a schematic section along the line 3—3 of FIG. 2;

DESCRIPTION OF A SPECIFIC EMBODIMENT

Figure 1:
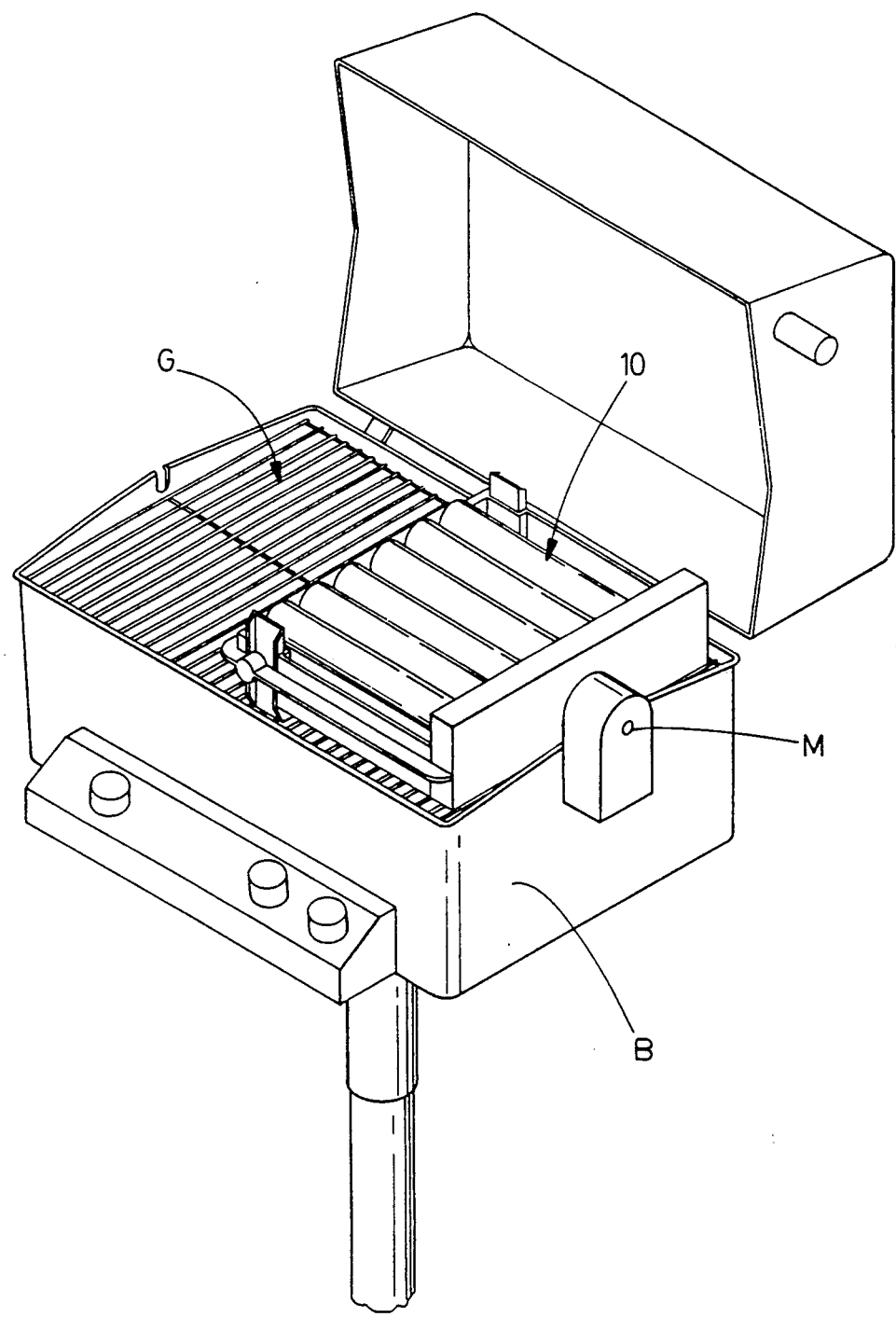
FIG. 1 is a perspective illustration of a cooking device in accordance with the invention shown in position on a typical domestic barbecue.

Referring first of all to FIG. 1, there is illustrated in schematic form a typical domestic gas barbecue indicated as B. Barbeques in general may be fired by coals, gas or the like in a manner well known per se and require no further description. The barbecue B will be provided with a grill G adapted for supporting foods over the coals gas or the like while being cooled. Barbecues B are in many cases provided with electrical drive motors indicated as M adapted to be mounted on a side of the barbecue B. Such barbecues are usually further equipped with rods or spits adapted to be mounted across the grill G, and having one end which is supported in a drive recess in the motor. Such a spit is omitted from this illustration for the sake of clarity, but it is in any event well known in the art.

Figure 4:
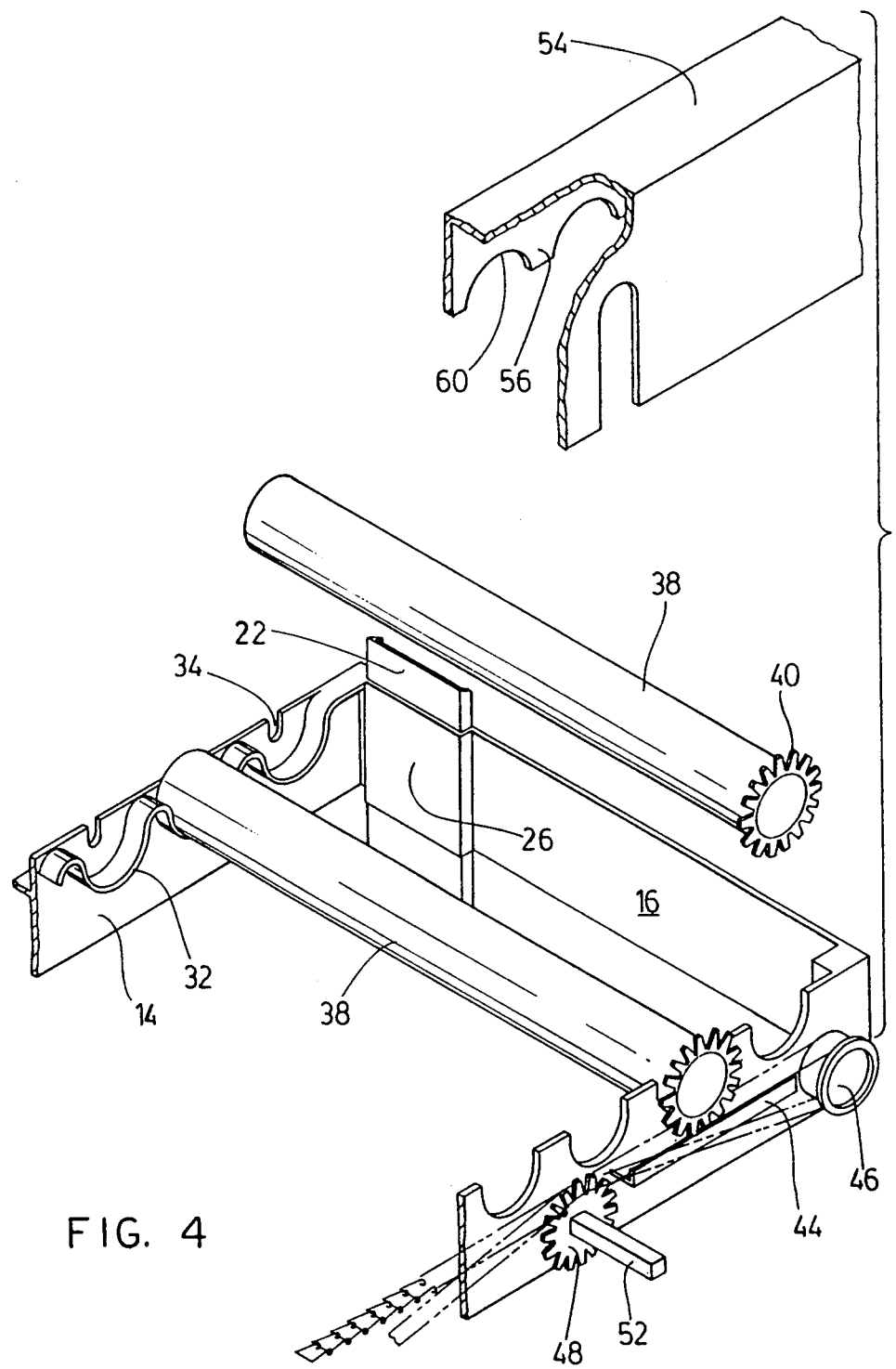
FIG. 4 is a partial perspective illustration of the cooking device, shown exploded.

The present invention comprises the cooking device indicated generally as 10, and illustrated in more detail in FIGS. 2, 3 and 4.

The cooking device 10 is adapted to be supported on the grill G, and foods to be rotated will then simply be placed on the cooking device 10 in a manner described below.

When not in use, the cooking device 10 can simply be removed, and the barbecue may be used for cooking other foods such as steaks and the like in a manner well known in the art. Thus the cooking device 10 serves simply as an accessory to a typical domestic barbecue B without in any way altering or detracting from its basic conventional mode of usage. Indeed, the cooking device 10 is made of such dimensions that it may occupy only a portion of the surface of the grill G so that it may be used simultaneously with the cooking of other foods (not shown) on unoccupied portions of the grill G.

The cooking device 10 is shown in more detail in FIG. 2, 3, and 4. It will be seen to comprise a generally rectangular frame defined by front and rear walls 12 and 14 and side walls 16—16. A continuous rib 18 is molded along rear wall 14 and a corresponding continuous rib 20 is molded along side wall 16—16.

In order to support the cooking device 10 on the grill G, leg membes 22—22 are formed, having foot portions 24—24 formed thereon at right angles, adapted to lie flat on the grill G.

The leg members 22—22 are received in recessed channel formations 26—26 formed in side walls 16—16. Retaining bolts 28—28 pass through bosses 30—30 in flange portions 20—20 on side walls 16—16. In this way the legs 22—22 may be vertically adjusted within their respective channels 26, and secured at the desired height by means to tightening up the bolts 28.

As best shown in FIG. 4, the rear wall 14 is provided with generally semi-circular rear bearing means in the form of bearing flanges 32. A plurality of such bearing flanges 32 are provided, all being of generally semi-circular shape. In this case, six such bearing flanges 32 are provided at equally spaced apart intervals along the length of wall 14.

Also provided on rear wall 14 are a plurality of bearing recesses 34. As will be seen there are six such bearing recesses 34 in this embodiment of invention, corresponding to the number of the bearing flanges 32. The bearing recesses 34 are located along what is in effect the central exis of the bearing flange 32, for reasons to be described below.

Within the front wall 12, there are provided a plurality of generally semi-circular front bearing means, consisting in this embodiment of semi-circular recesses 36. Each pair of recesses 36 and flanges 32 defines a common coaxial rotational axis, and register with one another in pairs. It will be noted that there are six such bearing recesses 36 in the front wall 12 corresponding to the number of bearing flanges 32 on the rear wall 14.

In this embodiment of the invention, which is particularly intended for the cooking of foods product such as sausages and the like, a plurality of, in this case six, tubular rollers 38 are provided, being received in the front bearing means 36 and the rear bearing means 32. As will be seen from FIG. 2, they thus supported in a common plain, parallel with one another, but spaced apart a certain distance, permitting the heat from the barbecue to cook the food products. The foods product are omitted for the sake of clarity since this form of cooking on rollers is well known.

The ends of the rollers, lying in the bearing flanges 32 are smooth and unobstructed, and terminate short of the rear wall 14.

The forward ends of the rollers 38 extend through the bearing recesses 36 forwardly of the front wall 12. On their forward free ends they are provided with drive sprockets indicated as 40.

In order to rotate the drive sprockets 40, and thus rotate the tubular rollers 38, there is provided a chain drive means indicated as 42. Chain drive means 42 is supported on the a chain support ledge 44, and runs, at each end of wall 12, around a chain support roller 46 rotateably mounted on wall 12.

In order to drive chain 42, a chain drive gear 48 is rotateably mounted intermediate the ends of wall 12 (FIG. 3).

Gear 48 is rotatably mounted on suitable bearing means 50, mounted on front wall 12.

Gear 48 is offset forwardly from ledge 44. The upper portion of chain 42 on the ledge 44 engages each of the sprockets 40.

The lower portion of chain 42 extends from rollers 36 upwardly over gear 48. The chain 42 has sufficient free play that it can adapt to the forwardly offset location of gear 48.

Extending from drive gear 48, is a drive shaft 52. Since most conventional barbecues and barbecue motors are designed to receive a drive shaft having a square cross-section, the shaft 52 is provided with a square cross-section correesponding to the drive shaft of the conventional barbecue spit.

It will however, be appreciated that the cooking device 10 according to the invention could conceivably be provided with its own motor means, in which case if desired, some other form of drive shaft configuration might be selected, or some from of adaptor could be provided converting shaft 52 to an alternate cross-section, if desired.

In order to cover the sprockets 40 and chain 42, during use, a front cover 54 is provided, which is adapted to be removably placed over the sprockets 40 and chain 42 and its associated mechanism. Front cover 54 is provided with front and rear walls 56 and 58. Rear wall 56 is provided with a plurality of semi-circular recesses 60, registering with the semi-circular bearing recesses 36 and the front wall 12, so as to provide clearance for the tubular rollers 38.

The front wall 58 extends downwardly to cover the chain 42, and guide rollers 46 and drive gear 48.

Lugs 62 are formed on the rear wall 56, in order to overlap front wall 12, and thus hold the housing 54 in position.

Front wall 58 wraps around at each end as at 58a, to provide, a complete enclosure for guide rollers 46.

If it is desired to cook other products such as meat sections, poultry, roasts, etc. on the cooking device 10, then it will be appreciated that the rollers 38 are unsuitable for the purpose.

Figure 5:
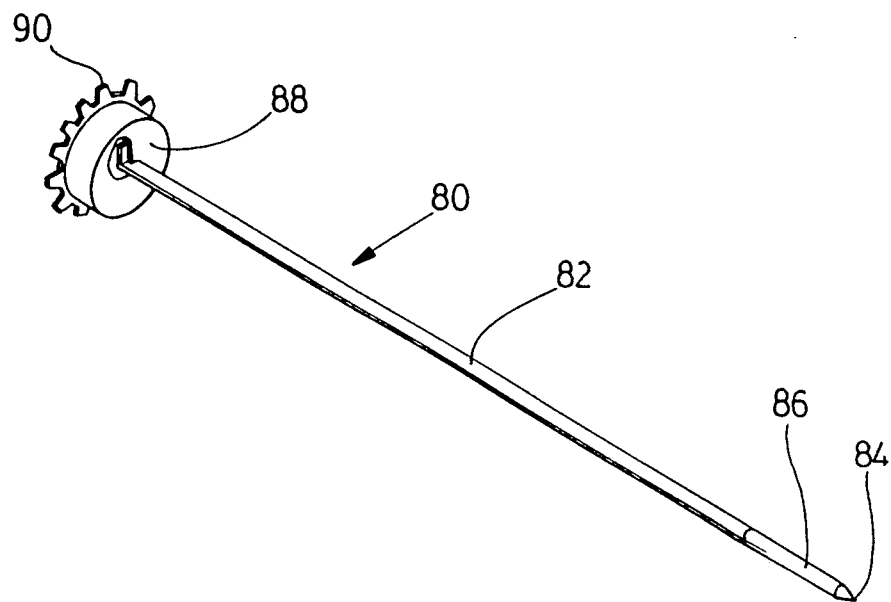
FIG. 5 is a partially cut away perspective illustration of an alternate emmbodiment showing a skewer embodiment to replace the roller embodiment of FIGS. 1, 2, 3 and 4, and, FIG. 6 is a perspective illustration of a further alternate embodiment of a form of skewer for use with foods such as corn.

Accordingly, as shown in FIG. 5, a form of skewer device is indicated generally as 80, being suitable for these other forms of cooking. The skewer device 80 consists of an elongated flattened shank portion 82 having a point 84, at its forward end which may be forced through meat sections poultry carcasses, roasts and the like.

Preferably, a small length or segment of the shank 82 has a generally cylindrical section indicated as 86 to be received in the bearing access 34 in rear wall 14.

At its rear or drive end, the skewer device 80, a generally cup-shaped bearing member 88, is provided, having drive sprockets 90 extending therefrom. The bearing member 88 is dimensioned so as to be received in the recesses 36 and the front wall 12, and the sprockets 90 are dimensioned to be engaged by the chain drive 42. The shank 82 is secured to the cup member 88 in any suitable manner such as by spot-welding or the like.

If it is desired to cook meat sections such as shiskebobs, meat sections, and vegetable portions, if desired, may be impaled on the skewer shank 82, and the skewer members 80 may then simply be placed in position between the front bearing recesses 36 and the rear bearing recesses 34. They will thus be rotated during cooking over the barbecue in a manner already described above.

If it is desired to cook for example, poultry carcasses, then possibly it may be necessary to use a smaller number of such skewer devices, in order to provide adequate space for the rotation of poultry carcasses. The same may also be true if it is desired to cook a roast.

Figure 6:
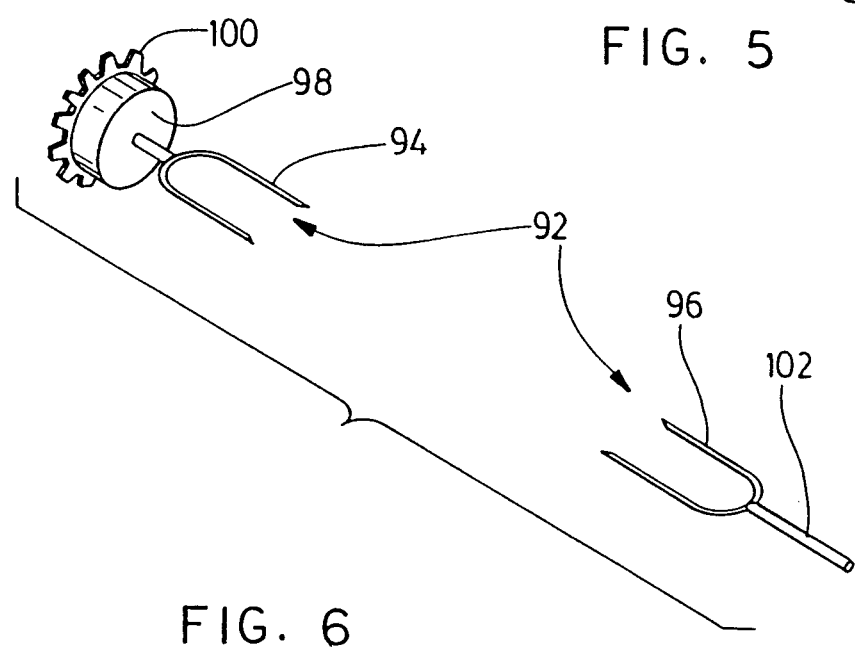

If it is desired to cook products such as corn, then the skewer devices 80 of FIG. 5 are unsuitable. In their place, by alternate cooking devices indicated generally as 92 in FIG. 6 are provided. These consist of front and rear generally U-shaped prong members 94 and 96 adapted to be forced into opposite ends of an ear of corn, for example. The front U-shaped member 94 has a cup-shaped bearing member 98 and a drive sprocket 100.

The rear prong member 96 has an axial bearing stem 102. The cup-shaped bearing 98 is adapted to be received in the bearing recess 36 and front wall 12. The axial bearing rod 102 is adapted to be received in the bearing recess 44 and rear wall 14.

In this way foods such as corn may be supported on cooking device 10, and rotated over a barbecue, for cooking.

The operation of the device is believed to be self-evident from the foregoing description and requires no elaboration.

It will thus be seen that the invention provides a cooking device suitable for use on a domestic barbecue, for cooking a wide range of different foods, all of which may be rotated over the barbecue, continuously, by motor means, without attention by a member fo the household.

It will also be seen that the device is readily interchangable from one mode of use to the other. It will also be seen that the device may be readily dismantled, and the various food bearing components may be placed for example in a dish washer and thoroughly cleansed.

The foregoing is a description of a preferred embodiment of the invention which is given here by way of examle only. The invention is not to be taken as limited to any of the specific features as described, but comprehends all such variations thereof as come within the scope of the appended claims.

What is claimed is:

1. A cooking device for rotating foods on a barbeque of the type adapted to co-operate with motor drive means and comprising:

frame means of generally rectangular shape, defining front and rear wall means said rear wall means defining inner and outer sides;

a plurality of generally U-shaped front bearing recess means formed in said front wall means;

an equal number of generally U-shaped rear bearing flange means formed on said inner side of said rear wall means and extending towards said front wall means, respective said front bearing recess means and rear bearing flange means being arranged in pairs on common axes, in registration with one another;

rear bearing recess means formed in said rear wall means, being located coaxial with said common axes of said front bearing recess means and said rear bearing flange means;

a plurality of cylindrical roller members, said roller members being dimensioned to be received in respective pairs of said generally U-shaped front bearing recess means and rear bearing flange means, and to be supported thereby for rotation on said common axes;

drive portions on said roller members extending outwardly of said front wall means and defining sprocket means;

chain drive means interengageable with respective sprocket means on respective said roller members said chain drive means being supported on said front wall means, beneath said sprocket means, whereby said sprocket means may be disengaged therefrom the upward movement relative thereof;

chain movement means engageable with said chain drive means for moving the same whereby to rotate all of said roller members simultaneously;

drive transmission means connected to said chain movement means, and being releaseably and supportively interengageable with said motor drive means, said roller members being disengagable from said front and rear bearing means and said chain drive means, by lifting said roller members therefrom, and whereby they may be reengaged by placing them downwardly thereon;

skewer means adapted to be received in said rear bearing recess means;

collar means on said skewer means adapted to be received in said front bearing recess means for rotation of said skewer means on said common axes, and, sprocket means formed on said collar means for engagement with said chain drive means.

2. A cooking device as claimed in claim, 1 and further including ledge means on said front wall means, located downwardly of said front bearing means, and chain guide means located at either end of said ledge means, whereby said chain drive means is moveable along said ledge means from one said chain guide means to the other.

3. A cooking device as claimed in claim 2, and wherein said chain movement means comprises drive sprocket means, a drive shaft on which said drive sprocket means is mounted, shaft bearing means on said front wall means, located at a point intermediate the ends of said front wall means, said drive sprocket means being engageable with said chain drive means, and said drive shaft including a shaft extension portion adapted to be releasebly and supportively interengaged with said motor means.

4. A cooking device as claimed in claim 3, wherein said drive sprocket means is located offset from said ledge means.

* * * * *